March 29, 1932.   F. L. DARLING   1,851,663

BAIL LIKE ELEMENT AND METHOD OF MAKING

Filed Nov. 6, 1930

Inventor

Frank L. Darling

By Cushman, Bryant Darby
Attorneys

Patented Mar. 29, 1932

1,851,663

UNITED STATES PATENT OFFICE

FRANK LEE DARLING, OF BALTIMORE, MARYLAND, ASSIGNOR TO CROWN CORK & SEAL COMPANY, INC., OF BALTIMORE, MARYLAND, A CORPORATION OF NEW YORK

BAIL-LIKE ELEMENT AND METHOD OF MAKING

Application filed November 6, 1930. Serial No. 493,852.

The present invention relates to bail-like elements of the type, for example, disclosed in my United States Patent 1,777,077 issued September 30, 1930. According to the disclosure of said patent, the bail-like element has the major function of opener, although it may also be used as a bail and has the form of such an element. The present invention relates particularly to an improvement in this bail and may be conveniently described in comparison therewith.

The bail of the patent is adapted for attachment to bottles, jars and the like, the free ends of the the bail being designed to grip spaced seats formed in the article to be associated therewith. In the manufacture of the bails, they have been formed with their free ends considerably spaced apart, it having been thought only necessary to close them sufficiently to give them a degree of gripping tension when spread slightly and engaged in their seats.

The bails are ordinarily manufactured at a point remote from the point of assembly with the containers and have been transported from the one point to the other loose in packing cases or similar receptacles. Due to the spaced relation of the free ends of the respective bails, it has been found that in thus commingling and handling them they become badly intertangled and each must be separately untangled from the mass with a consequent great loss in time and labor. The same difficulty arises, as may be imagined, if the bails are placed in a tumbling machine for plating.

Now, I have found that if in forming the bails their free ends are brought together, so that the bails are in substantially the form of closed loops, they may be commingled and transported or otherwise handled without the occurrence of any intertangling. The bails are deformable, so that they retain any form to which they may be bent, but at the same time they have a certain inherent resiliency which causes them to grip firmly in the seats provided for them. By spreading the free ends of the bails from closed relation to the spaced relation necessary to engage them with the seats a greater gripping tension is secured than when the ends are merely spread from an initially spaced relation as was done heretofore.

Thus, by initially bringing the ends of the bails together, as contemplated under the present invention, intertangling of the bails is effectively prevented and greater gripping tension is secured when the bails are applied to their associated articles.

A bail similar to that shown in my above mentioned patent, but formed in accordance with and typical of the present invention, is shown in the accompanying drawings. In the drawings.

Figure 1:
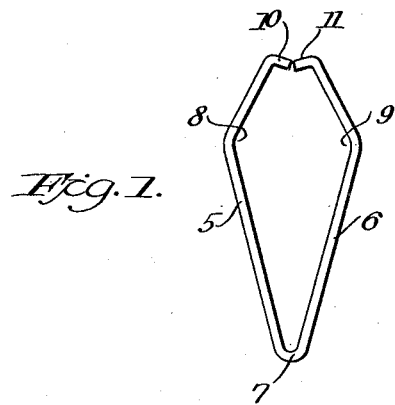
Figure 1 is a plan view of a bail as initially formed.

Referring to the drawings the bail as shown is substantially V-shaped and comprises legs 5 and 6 joined together at an apex 7. Adjacent their free ends, the legs 5 and 6 are bent inwardly to form the obtuse angles indicated at 8 and 9, while at their extremities the legs are bent inwardly at substantially right angles to their adjacent portions to form the opposed lugs 10 and 11. The bail, as described, is formed from a blank in the form of a strip, ordinarily of wire. In bending the blank to the form shown the apex angle is closed to a greater extent than heretofore, so as to bring the end portions 10 and 11 together. These end portions may be in actual contact or they may be slightly overlapped, but in any event, assuming the element to be made of wire, the distance between the end portions 10 and 11 must at least be less than the diameter of the wire.

Figure 2:
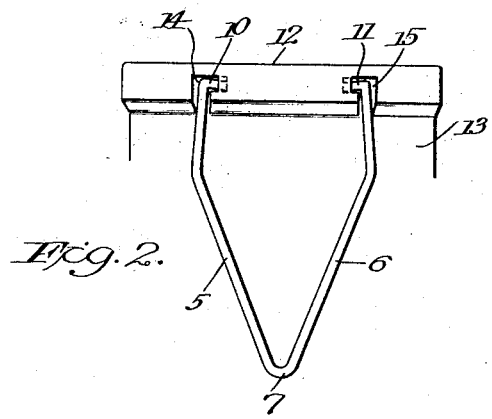
Figure 2 is a plan view of the bail as attached to a jar, the latter being shown only in part.

Due to the form of the bent end portions 10 and 11 they may be brought together with legs 5 and 6 still in spaced relation, so as to be readily gripped when the element is to be applied to an article as shown in Figure 2. Further, it will be noted that end portions or lugs 10 and 11 come together to form an outer obtuse angle, so that there is very little danger of another element being wedged between and past them.

In Figure 2, reference numeral 12 designates the top bead of a jar 13, the bead having formed therein seats 14 and 15, as described in my patent above referred to. The seats are considerably spaced apart, so that when the bail is spread from its initial closed position, considerable gripping tension will be developed and its ends will thus be securely seated.

Although I have shown and described a specific and preferred embodiment of my invention, it will be understood that I do not limit myself except as determined in the following claims.

I claim:

1. As a new article of manufacture, a deformable substantially V-shaped bail-like element having opposed inwardly bent portions remote from its apex and being so formed in manufacture that said inwardly bent portions assume a position in contact with each other, whereby to prevent intertangling of the elements when commingled.

2. As a new article of manufacture, a deformable substantially V-shaped bail-like element of wire, said element having opposed inwardly bent portions at its free ends and being so formed in manufacture that said inwardly bent free ends assume a position in contact with each other, whereby to prevent intertangling of the elements when commingled.

3. As a new article of manufacture, a deformable bail-like element having opposed inwardly bent free ends and being so formed in manufacture that said ends assume a position in contact with each other whereby to prevent intertangling with other similar elements when commingled therewith.

In testimony whereof I have hereunto set my hand.

FRANK LEE DARLING.